(12) United States Patent
Chang et al.

(10) Patent No.: US 11,589,017 B1
(45) Date of Patent: Feb. 21, 2023

(54) GROUND LINE MONITORING SYSTEM

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/539,365

(22) Filed: Dec. 1, 2021

(51) Int. Cl.
H04N 9/04 (2006.01)
H04N 9/09 (2006.01)
H04N 17/00 (2006.01)

(52) U.S. Cl.
CPC ........... *H04N 9/09* (2013.01); *H04N 9/04521* (2018.08); *H04N 17/002* (2013.01)

(58) Field of Classification Search
CPC .................................................. H04N 9/04521
See application file for complete search history.

(56) References Cited

U.S. PATENT DOCUMENTS

| 10,427,602 | B1* | 10/2019 | Bertollini | G02B 27/0101 |
| 2011/0102562 | A1* | 5/2011 | Johnson, Jr. | H04N 13/324 |
| | | | | 348/58 |
| 2011/0102563 | A1* | 5/2011 | Johnson, Jr. | H04N 13/334 |
| | | | | 348/60 |
| 2011/0181757 | A1* | 7/2011 | Fish | H04N 5/23293 |
| | | | | 348/E5.053 |
| 2016/0187651 | A1* | 6/2016 | Border | G06F 3/011 |
| | | | | 345/8 |
| 2017/0094258 | A1* | 3/2017 | Cooper | H04N 9/04521 |
| 2020/0371378 | A1* | 11/2020 | Makinen | H04N 13/354 |
| 2021/0055549 | A1* | 2/2021 | Chang | G03H 1/2286 |
| 2021/0112647 | A1* | 4/2021 | Coleman | H05B 47/11 |
| 2021/0329892 | A1* | 10/2021 | Kozachenok | G01S 15/96 |

OTHER PUBLICATIONS

U.S. Appl. No. 17/534,982, filed Nov. 24, 2021, pp. 1-45.
U.S. Appl. No. 17/534,987, filed Nov. 24, 2021, pp. 1-54.
U.S. Appl. No. 17/542,899, filed Dec. 6, 2021, pp. 1-51.

* cited by examiner

*Primary Examiner* — Brian P Yenke
(74) *Attorney, Agent, or Firm* — Vivacqua Crane, PLLC

(57) ABSTRACT

A ground line monitoring system includes a camera mounted in a first automobile vehicle. A waveguide directs a light into the camera having a first in-coupling grating receiving a first light imaging data and passing the first light imaging data as a first frequency of the light and a second in-coupling grating receiving a second light imaging data and passing the second light imaging data as a second frequency of the light. A color filter wheel receives the first frequency of the light and the second frequency of the light. An image sensor of the camera receives the first frequency of the light and the second frequency of the light at different times due to rotation of the color filter wheel. A controller performs a calculation using directions and angles of the first frequency of the light and the second frequency of the light to correct a camera image.

17 Claims, 2 Drawing Sheets

GROUND LINE MONITORING SYSTEM

INTRODUCTION

The present disclosure relates to automobile vehicle head-up display systems and vehicle ground lines impacting image display on the head-up display.

In automobile vehicles having a head-up display, a vehicle can have multiple ground lines. Each ground line leads to a different eye height and vehicle pitch. To align a virtual image with a reality on an augmented reality head-up display (ARHUD), information relating an eye height and a vehicle pitch are required. The vehicle pitch may vary however, particularly in trucks including pickup trucks whose ground clearance may vary. In addition, the vehicle pitch may also vary depending on a load condition and load distribution for trucks. Vehicle pitch differences may in turn create issues such as image clarity and accuracy with the virtual images created on the ARHUD.

Thus, while current vehicle head-up display systems achieve their intended purpose, there is a need for a new and improved ground line monitoring system presenting data to a head-up display of an automobile vehicle.

SUMMARY

According to several aspects, a ground line monitoring system includes a camera mounted in a first automobile vehicle. A waveguide directs light into the camera having a first in-coupling grating receiving a first light imaging data and passing the first light imaging data as a first frequency of the light and a second in-coupling grating receiving a second light imaging data and passing the second light imaging data as a second frequency of the light. A color filter wheel receives the first frequency of the light and the second frequency of the light. An image sensor of the camera receives the first light frequency and the second light frequency at different times due to rotation of the color wheel. A controller performs a calculation using directions and angles of the first light frequency and the second light frequency to correct a camera image.

In another aspect of the present disclosure, an out-coupling of the waveguide receives the first light imaging data directed from the first in-coupling grating via a first refractive path and receives the second light imaging data directed from the second in-coupling grating via a second refractive path and directs the first light imaging data and the second light imaging data to the image sensor.

In another aspect of the present disclosure, a lookup table is saved in a memory of the controller, wherein the controller performs the calculation by applying data from predefined data saved in the lookup table of the controller.

In another aspect of the present disclosure, a groundline and a pitch data of the first automobile vehicle are saved in a memory of, and accessible for use by the controller.

In another aspect of the present disclosure, a head-up display in the first automobile vehicle presents the camera image.

In another aspect of the present disclosure, the camera image defines a second automobile vehicle.

In another aspect of the present disclosure, light entering the camera from a first direction is redirected at a first different angle, and light entering from a second direction is redirected at a second different angle.

In another aspect of the present disclosure, wherein the first direction and the second direction and the first different angle and the second different angle of the light are applied by the controller to center the camera image on the head-up display.

In another aspect of the present disclosure, the camera is mounted at a predefined camera height and a camera orientation.

In another aspect of the present disclosure, an operator's eye height and a vehicle ground line are converted using the camera height and the camera orientation.

According to several aspects, a ground line monitoring system includes a camera mounted in a first automobile vehicle having a camera height and a camera orientation. A waveguide produces a time-sequential capture of image data of the camera. A calibration and training step wherein a correlation between appearance differences of a feature defining a second automobile vehicle at different views and the camera height and the camera orientation are evaluated. A lookup table is generated using data collected in the calibration and training step. A video is captured by the camera including at least the feature defining the second automobile vehicle. A vehicle groundline and an operator's eye height are converted from the camera height and the camera orientation using data in the lookup table. A centered image of at least the feature is generated using the vehicle groundline and the operator's eye height presented on a head-up display of the first automobile vehicle.

In another aspect of the present disclosure, if a visible image including the second automobile vehicle received by the camera for display on the head-up display differs from a preprogrammed "centered" image saved in a memory, a graphic being displayed on the head-up display is re-centered.

In another aspect of the present disclosure, image data captured by the camera is compared against differences between a high position and a low position of test camera image.

In another aspect of the present disclosure, a specific height and a specific pitch are linked to the image data using data in the lookup table.

In another aspect of the present disclosure, a controller performs a calculation using directions and angles of the image data.

In another aspect of the present disclosure, light entering the camera from a first direction is redirected at a different angle; and light entering the camera from a second direction is redirected at a second different angle.

In another aspect of the present disclosure, the controller calculates the first direction and the second direction and calculates the different angle and the second different angle by applying data saved in the lookup table to display the image data as the centered image.

According to several aspects, a method for performing automobile vehicle ground line monitoring comprises: mounting a camera in a first automobile vehicle; directing light into the camera using a waveguide having a first in-coupling grating receiving a first light imaging data and passing the first light imaging data as a first frequency of the light; the waveguide having a second in-coupling grating receiving a second light imaging data and passing the second light imaging data as a second frequency of the light; passing the first frequency of the light and the second frequency of the light through a color filter wheel; receiving the first light frequency and the second light frequency via an image sensor of the camera at different times in a time sequential due to rotation of the color wheel; and performing a calculation in a controller using directions and angles of the first light frequency and the second light frequency to correct a camera image.

In another aspect of the present disclosure, the method further includes: receiving the first light imaging data directed from the first in-coupling grating via a first refractive path of an out-coupling of the waveguide; receiving the second light imaging data directed from the second in-coupling grating via a second refractive path of the out-coupling of the waveguide; and directing the first light imaging data and the second light imaging data to the image sensor.

In another aspect of the present disclosure, the method further includes: redirecting light entering the camera from a first direction at a first different angle; redirecting light entering the camera from a second direction at a second different angle; and applying the first direction and the second direction and the first different angle and the second different angle of the light using the controller to center the camera image on a head-up display of the first automobile vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
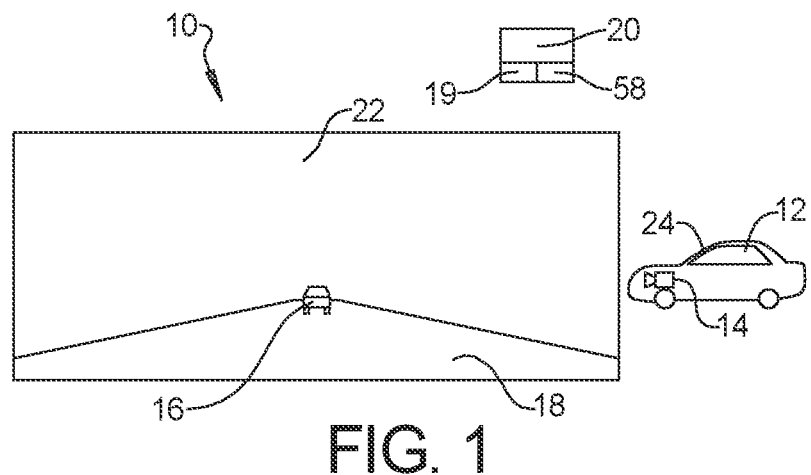
FIG. 1 is a front elevational view looking forward of a head-up display for a ground line monitoring system according to an exemplary aspect.

Referring to FIG. 1, a ground line monitoring system 10 is provided for a first automobile vehicle 12 having a camera 14 which receives images of a second automobile vehicle 16 positioned in front of the first automobile vehicle 12 on a roadway 18. According to several aspects, the camera 14 may be a single camera or may define multiple cameras. The ground line monitoring system 10 applies an algorithm to the camera imaging data defining the second automobile vehicle 16 as well as groundline and pitch data of the first automobile vehicle 12 saved in a memory 19 of, and accessible for use by a controller 20 positioned within the first automobile vehicle 12. According to several aspects, the controller 20 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

For certain vehicle designs of the first automobile vehicle 12, including for example pickup trucks, large sport utility vehicles (SUVs) and vans the first automobile vehicle 12 may have multiple ground lines. Each ground line may result in a different eye height of the operator of the first automobile vehicle 12 and a different vehicle pitch. To align a virtual image to a real world object, the controller 20 calculates the groundline and the pitch of the first automobile vehicle 12 based on the feature such as the second automobile vehicle 16 in the images captured by the camera 14. The calculated groundline and the pitch data is then passed to an augmented reality head-up display (HUD) 22 of the first automobile vehicle 12. The HUD 22 presents information to an operator of the first automobile vehicle 12 and is visible through a windshield 24. The groundline and the pitch data are applied to adjust an image alignment visible in the HUD 22 to optimize a central alignment of the virtual image on the HUD 22 to the real world.

Referring to FIG. 2 and again to FIG. 1, by introducing different views to a camera sensor (discussed below) of the camera 14, the camera 14 may perform as a stereoscopic camera. The groundline and the pitch may be obtained by comparing a same feature captured from different views. The same feature will appear having different sizes and orientations depending on a height pitch angle of the view of the camera 14. To generate different views of the same image, i.e., different views of the second automobile vehicle 16, a waveguide 26 is provided. The waveguide 26 includes a first in-coupling grating 28 which receives first light imaging data 30 as a first frequency of light and includes a second in-coupling grating 32 which receives second light imaging data 34 as a second frequency of light. The first light imaging data 30 is directed from the first in-coupling grating 28 via a first refractive path 36 to an out-coupling 38 of the waveguide 26. Similarly, the second light imaging data 34 is directed from the second in-coupling grating 32 via a second refractive path 40 to the out-coupling 38. The out coupling 38 directs the two frequencies of light into the camera 14, which passes through a spinning color filter wheel 42 and is directed onto an image sensor 44 of the camera 14.

The first light imaging data 30 as the first frequency of light appears to capture an image of the second automobile vehicle 16A which is positioned below a centerline 50A of an exemplary HUD image 46. Contrasted to this, the second light imaging data 34 as the second frequency of light appears to capture an image of the second automobile vehicle 16B which is positioned above a centerline 50B of an exemplary HUD image 52.

The gratings including the first in-coupling grating 28 and the second in-coupling grating 32 are made using a holographic manufacturing method which redirects light in a specific direction. Using holographic interference, the system selects light entering from a first direction and redirects the light at a different angle. The system also selects light entering from a second direction and redirects the light at a second different angle. The controller 20 then performs a disparity calculation using the directions and angles of the light by applying data from predefined data saved in a lookup table 58, shown in FIG. 1, of the controller 20 to correct a camera image 56 so the items presented on the HUD 22 such as the second automobile vehicle 16 are centered in the camera image 56 of the HUD 22.

Figure 2:
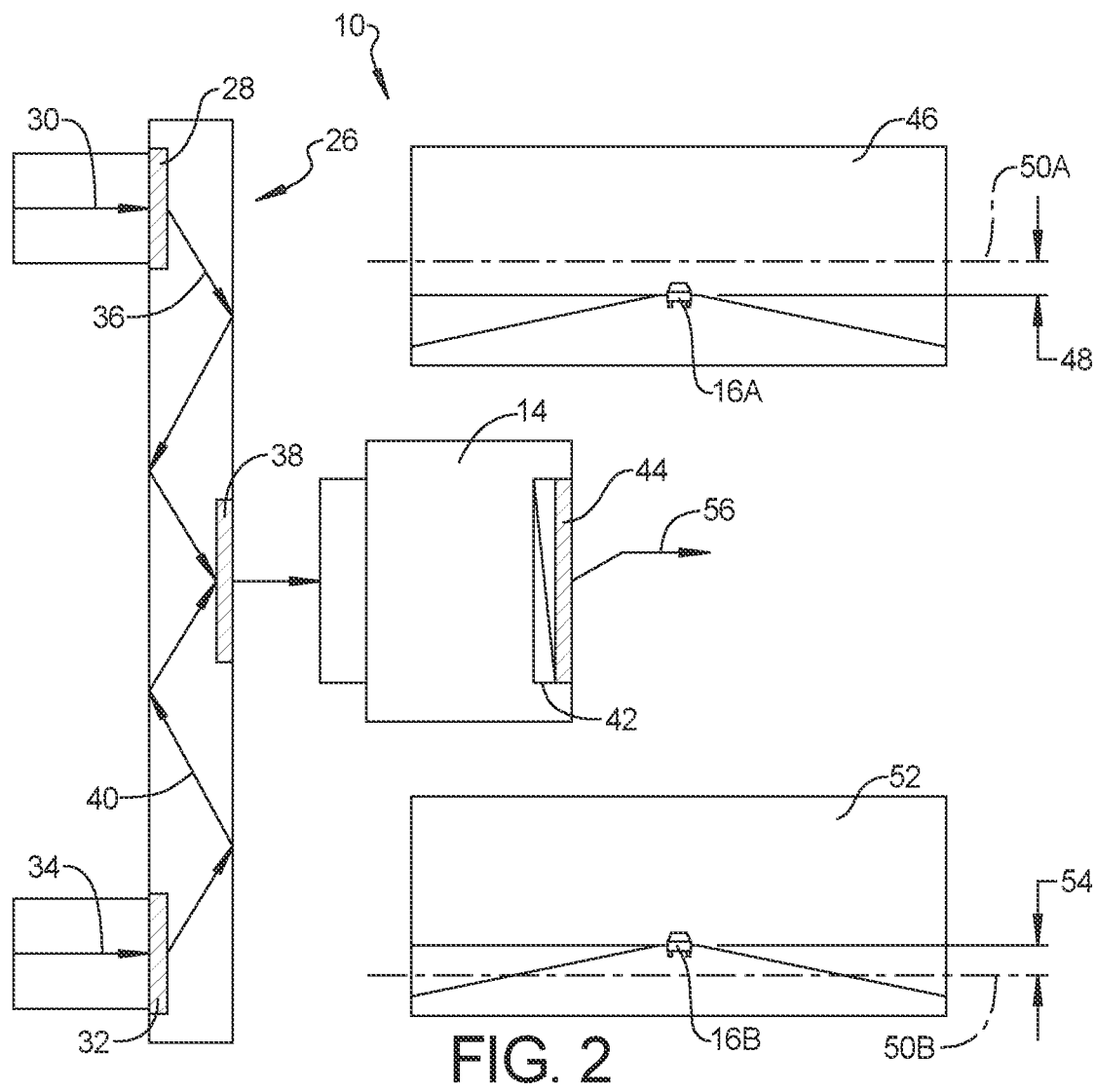
FIG. 2 is a side elevational view of a waveguide directing light into a camera of the system of FIG. 1.

Referring generally to FIGS. 3 through 6 and again to FIGS. 1 and 2, the ground line monitoring system 10 introduces stereoscopic-like characteristics in a camera with a waveguide and a time-sequential capturing of data. The same feature in the real world may appear different at different perspective views and angles. During a calibration and training step, a correlation between appearance differences of the feature such as the second automobile vehicle 16 at different views and the camera height and orientation are evaluated. The lookup table 58 is then generated. On the road, the camera 14 captures a video including at least one captured feature such as the second automobile vehicle 16 and uses the captured feature to understand a height and an orientation of the camera 14. A vehicle groundline and an operator's eye height are converted from a camera height and a camera orientation using data in the lookup table 58.

During the calibration and training step the camera 14 is oriented at different heights and pitches. Features are captured at different distances from the camera 14 for example at a high position and a low position, with the lookup table 58 populated having features differences at different vehicle camera heights and at different vehicle pitches. The camera 14 is installed in the first automobile vehicle 12 at a known height of the first automobile vehicle 12. During subsequent driving operation the camera 14 captures image data which is compared against the feature differences between the high position and the low position and links to a specific height and a specific pitch using data in the lookup table 58. The operator's eye height and the vehicle ground line are then calculated using the controller 20 by applying the known camera height.

The waveguide-based camera design and a corresponding algorithm calculate the groundline and the pitch of the first automobile vehicle 12. The groundline and pitch information is then passed to the HUD 22 for image adjustment to align with the environment. If the visible image such as the second automobile vehicle 16 received by the camera 14 for display on the HUD image 46 differs from a preprogrammed "centered" image saved in the memory 19, the ground line monitoring system 10 changes the graphic being displayed on the HUD 22 to center the image.

Figure 3:
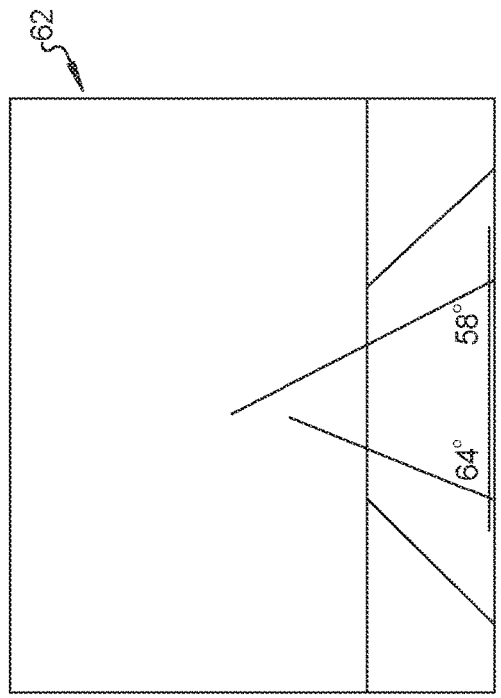
FIG. 3 is a front elevational view looking forward of a first calibration system configuration for the system of FIG. 1.

Referring more specifically to FIG. 3, a first calibration system configuration 60 positions a test camera at a high position and at a zero vehicle pitch.

Figure 4:
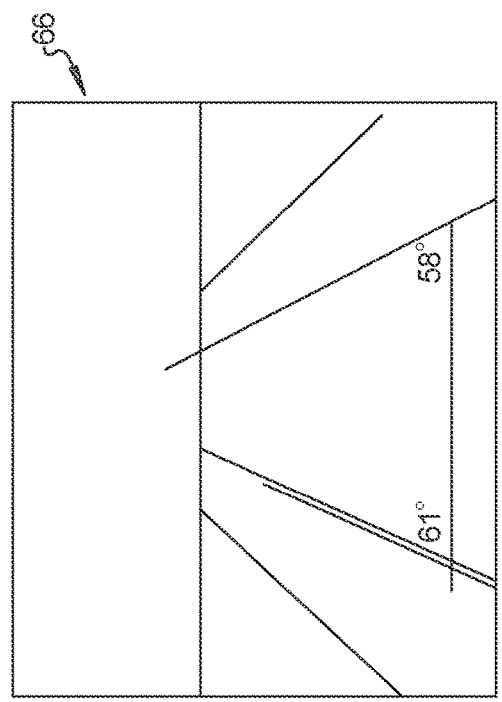
FIG. 4 is a front elevational view looking forward of a first calibration system configuration for the system of FIG. 1.

Referring more specifically to FIG. 4, a second calibration system configuration 62 positions a test camera at a low position and at a zero vehicle pitch.

Figure 5:
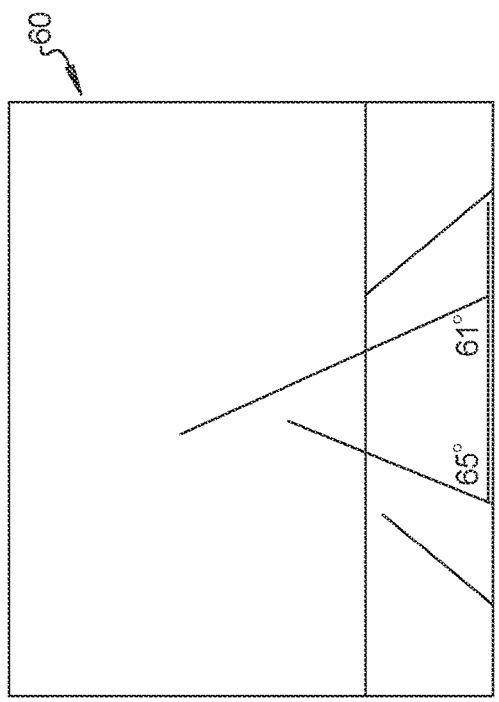
FIG. 5 is a front elevational view looking forward of a first calibration system configuration for the system of FIG. 1.

Referring more specifically to FIG. 5, a third calibration system configuration 64 positions a test camera at a high position and at an exemplary −5 degree down vehicle pitch.

Figure 6:
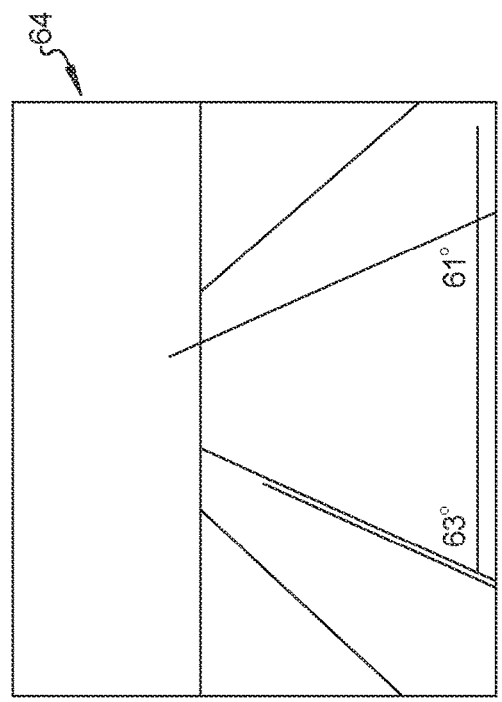
FIG. 6 is a front elevational view looking forward of a first calibration system configuration for the system of FIG. 1.

Referring more specifically to FIG. 6, a fourth calibration system configuration 66 positions a test camera at a low position and at an exemplary −5 degree down vehicle pitch.

The ground line monitoring system 10 of the present disclosure offers several advantages. These include introducing different views to a camera sensor using a waveguide and time-sequential capture approach. The camera can then perform as a stereoscopic camera. An automobile vehicle groundline and pitch can be obtained by comparing the same features captured from different views. The same feature or features will appear with different sizes and orientations depending on a height pitch angle of the view. The present system achieves proper alignment of an augmented reality graphic based for example on a vehicle load which impacts the vehicle height and the vehicle ground line.

With respect to the controller 20 discussed above with respect to FIG. 1, the memory 19 may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an electronic control unit (ECU). Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a random access memory (RAM), a PROM, an erasable programmable read-only memory (EPROM), a FLASH electrically erasable programmable read-only memory (EEPROM), any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the Procedural Language extensions to the Structured Query Language (PL/SQL) mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A ground line monitoring system, comprising:
   at least one camera mounted in a first automobile vehicle;
   at least one waveguide directing a light into the at least one camera having a first in-coupling grating receiving a first light imaging data and passing the first light imaging data as a first frequency of the light and a second in-coupling grating receiving a second light imaging data and passing the second light imaging data as a second frequency of the light;
   at least one color filter wheel receiving the first frequency of the light and the second frequency of the light;
   at least one image sensor of the camera receiving the first frequency of the light and the second frequency of the light at different times due to rotation of the at least one color filter wheel; and
   at least one controller performing a calculation using directions and angles of the first frequency of the light and the second frequency of the light to correct at least one camera image.

2. The ground line monitoring system of claim 1, further including at least one out-coupling of the waveguide receiving the first light imaging data directed from the first in-coupling grating via a first refractive path and receiving the second light imaging data directed from the second in-coupling grating via a second refractive path and directing the first light imaging data and the second light imaging data to the at least one image sensor.

3. The ground line monitoring system of claim 2, further including a lookup table saved in a memory of the at least one controller, wherein the at least one controller performs the calculation by applying data from predefined data saved in the lookup table of the at least one controller.

4. The ground line monitoring system of claim 3, further including a groundline and a pitch data of the first automobile vehicle saved in a memory of the at least one controller, and accessible by the at least one controller.

5. The ground line monitoring system of claim 4, further including a head-up display in the first automobile vehicle presenting a virtual image of the at least one camera image.

6. The ground line monitoring system of claim 5, wherein the at least one camera defines a first camera and a second camera.

7. The ground line monitoring system of claim 6, wherein using holographic interference, the light entering the first camera and the second camera from a first direction is redirected at a first different angle, and the light entering the first camera and the second camera from a second direction is redirected at a second different angle.

8. The ground line monitoring system of claim 7, wherein the at least one controller applies the first direction and the second direction and the first different angle and the second different angle of the light to obtain a current orientation and a current height of the at least one camera.

9. The ground line monitoring system of claim 1, wherein the at least one camera is mounted at a predefined camera height and a camera orientation.

10. The ground line monitoring system of claim 9, further including an operator's eye height and a vehicle ground line converted using a current camera height and a camera orientation.

11. The ground line monitoring system of claim 1, further comprising:
   a calibration and training portion wherein a correlation between appearance differences of a feature defining a second automobile vehicle at different views and a camera height of the at least one camera and a camera orientation of the at least one camera are evaluated;
   a lookup table generated using data collected in the calibration and training portion;
   a video captured by the at least one camera including at least the feature defining the second automobile vehicle;
   a vehicle groundline and an operator's eye height converted from the camera height and the camera orientation by data accessed in the lookup table; and
   a centered image of at least the feature generated using the vehicle groundline and the operator's eye height presented on a head-up display of the first automobile vehicle.

12. The ground line monitoring system of claim 11, wherein if a visible image including the second automobile vehicle received by the at least one camera for display on the head-up display differs from a preprogrammed "centered" image saved in a memory, a graphic being displayed on the head-up display is re-centered.

13. The ground line monitoring system of claim 12, including image data captured by the at least one camera compared against differences between a high position and a low position of a test camera image, lower than the high position.

14. The ground line monitoring system of claim 13, wherein a specific height and a specific pitch are linked to the image data using data in the lookup table.

15. A method for performing automobile vehicle ground line monitoring, comprising:
   mounting a camera in a first automobile vehicle;
   directing a light image into the camera using a waveguide having a first in-coupling grating receiving a first light imaging data and passing the first light imaging data as a first frequency of the light; the waveguide having a second in-coupling grating receiving a second light imaging data and passing the second light imaging data as a second frequency of the light;
   passing the first frequency of the light and the second frequency of the light through a color filter wheel;
   receiving the first frequency of the light and the second frequency of the light via an image sensor of the camera at different times due to rotation of the color filter wheel; and
   performing a calculation in a controller using directions and angles of the first frequency of the light and the second frequency of the light to correct a camera image.

16. The method of claim 15, further including:
   receiving the first light imaging data directed from the first in-coupling grating via a first refractive path of an out-coupling of the waveguide;
   receiving the second light imaging data directed from the second in-coupling grating via a second refractive path of the out-coupling of the waveguide; and directing the first light imaging data and the second light imaging data to the image sensor.

17. The method of claim 15, further including:
redirecting the light entering the camera from a first direction at a first different angle;
redirecting the light entering the camera from a second direction at a second different angle; and
applying the first direction and the second direction and the first different angle and the second different angle of the light using the controller to center the camera image on a head-up display of the first automobile vehicle.

\* \* \* \* \*